(12) United States Patent
Poore et al.

(10) Patent No.: US 7,372,182 B2
(45) Date of Patent: May 13, 2008

(54) AXIAL GAP ALTERNATOR ASSOCIATED WITH A FLYWHEEL

(75) Inventors: Bernard Brandt Poore, East Moline, IL (US); Barnard Edwin Romig, Illinois City, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/441,416

(22) Filed: May 25, 2006

(65) Prior Publication Data

US 2007/0273233 A1  Nov. 29, 2007

(51) Int. Cl.
*H02K 21/12* (2006.01)

(52) U.S. Cl. .................... 310/156.36; 310/266

(58) Field of Classification Search ............... 310/266, 310/267, 268
See application file for complete search history.

(56) References Cited

U.S. PATENT DOCUMENTS

| | | | |
|---|---|---|---|
| 3,828,212 A * | 8/1974 | Harkness et al. ........... 310/153 |
| 4,233,858 A | 11/1980 | Rowlett ...................... 74/675 |
| 6,064,121 A * | 5/2000 | Shervington et al. ....... 290/1 A |
| 6,232,690 B1 * | 5/2001 | Schmider ............... 310/156.37 |
| 6,323,573 B1 * | 11/2001 | Pinkerton ................... 310/178 |
| 6,720,688 B1 * | 4/2004 | Schiller ....................... 310/64 |
| 6,954,010 B2 * | 10/2005 | Rippel et al. ............. 310/60 A |
| 6,995,494 B2 | 2/2006 | Haugan et al. ............. 310/268 |
| 6,998,743 B2 | 2/2006 | Fujii et al. .................... 310/81 |
| 7,024,859 B2 | 4/2006 | Jayabalan et al. ............ 60/716 |
| 7,084,548 B1 * | 8/2006 | Gabrys ....................... 310/268 |
| 2006/0020383 A1 | 1/2006 | Betz et al. .................... 701/50 |
| 2006/0028081 A1 | 2/2006 | Minagawa ............. 310/156.36 |
| 2006/0043801 A1 | 3/2006 | Adra .......................... 310/54 |

* cited by examiner

*Primary Examiner*—Dang Le
*Assistant Examiner*—Nguyen Hanh

(57) ABSTRACT

An axial gap alternator comprises a first carrier associated with or secured to an output shaft of an internal combustion engine. A first carrier carries a first set of magnets arranged radially about a rotational axis. A second carrier carries a second set of magnets arranged radially and spaced apart axially from the first set of magnets. A stator intervenes axially between the first set of magnets and the second set of magnets.

19 Claims, 8 Drawing Sheets

US 7,372,182 B2

AXIAL GAP ALTERNATOR ASSOCIATED WITH A FLYWHEEL

FIELD OF THE INVENTION

The present invention relates to an axial gap alternator associated with a flywheel.

BACKGROUND OF THE INVENTION

A hybrid vehicle may include an internal combustion engine that provides rotational energy to an alternator or generator. Although the mechanical coupling between the alternator and the internal combustion engine may comprise a belt, a chain, gears, or pulleys or other intermediary mechanical devices, such intermediary devices may occupy too much space within an engine compartment or be less reliable than desired. Accordingly, there is a need for an axial gap alternator associated with a flywheel of an output shaft (e.g., crankshaft) of the internal combustion engine.

SUMMARY OF THE INVENTION

An axial gap alternator comprises a first carrier or flywheel associated with an output shaft of an internal combustion engine. A first carrier carries a first set of magnets arranged radially about a rotational axis. A second carrier carries a second set of magnets arranged radially and spaced apart axially from the first set of magnets. A stator intervenes axially between the first set of magnets and the second set of magnets.

DESCRIPTION OF THE PREFERRED EMBODIMENT

Figure 1:
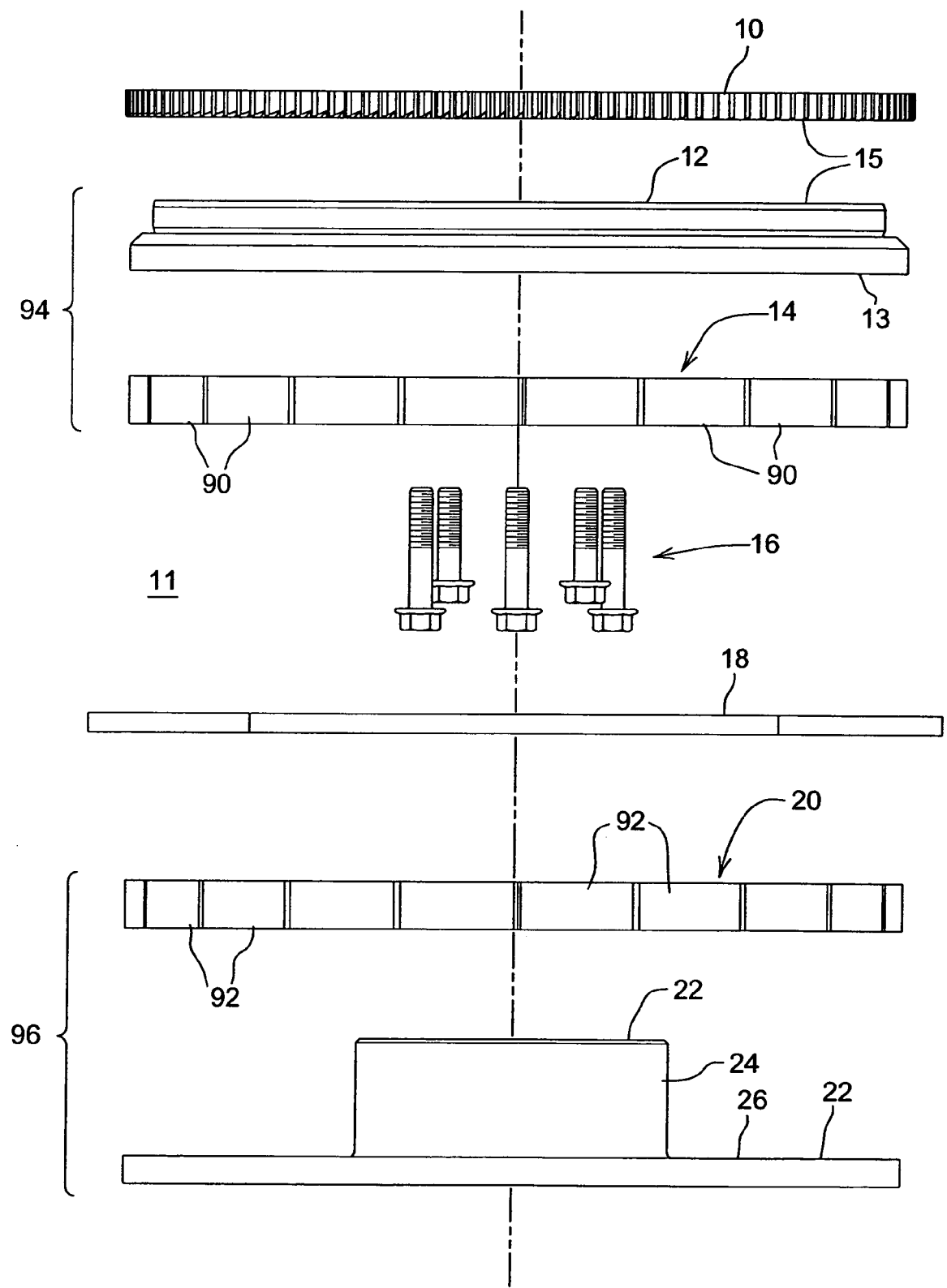
FIG. 1 is an exploded side view of a first embodiment of an axial gap alternator in accordance with the invention.

In accordance with one embodiment, FIG. 1 illustrates axial gap alternator 11, which comprises a first carrier 12, a second carrier 22, and a stator 18. The first carrier 12 is associated with an output shaft (e.g., crankshaft) of an internal combustion engine. An end of the output shaft may contain threaded bores or otherwise be configured to engage or receive one or more fasteners 16. In one embodiment, the first carrier 12 is secured to the output shaft via one or more fasteners 16. The first carrier 12 receives a first set 14 of magnets arranged radially. A second carrier 22 receives a second set 20 of magnets arranged radially and spaced apart from the first set 14 of magnets. A stator 18 intervenes axially between the first set 14 of magnets and the second set 20 of magnets.

Figure 5:
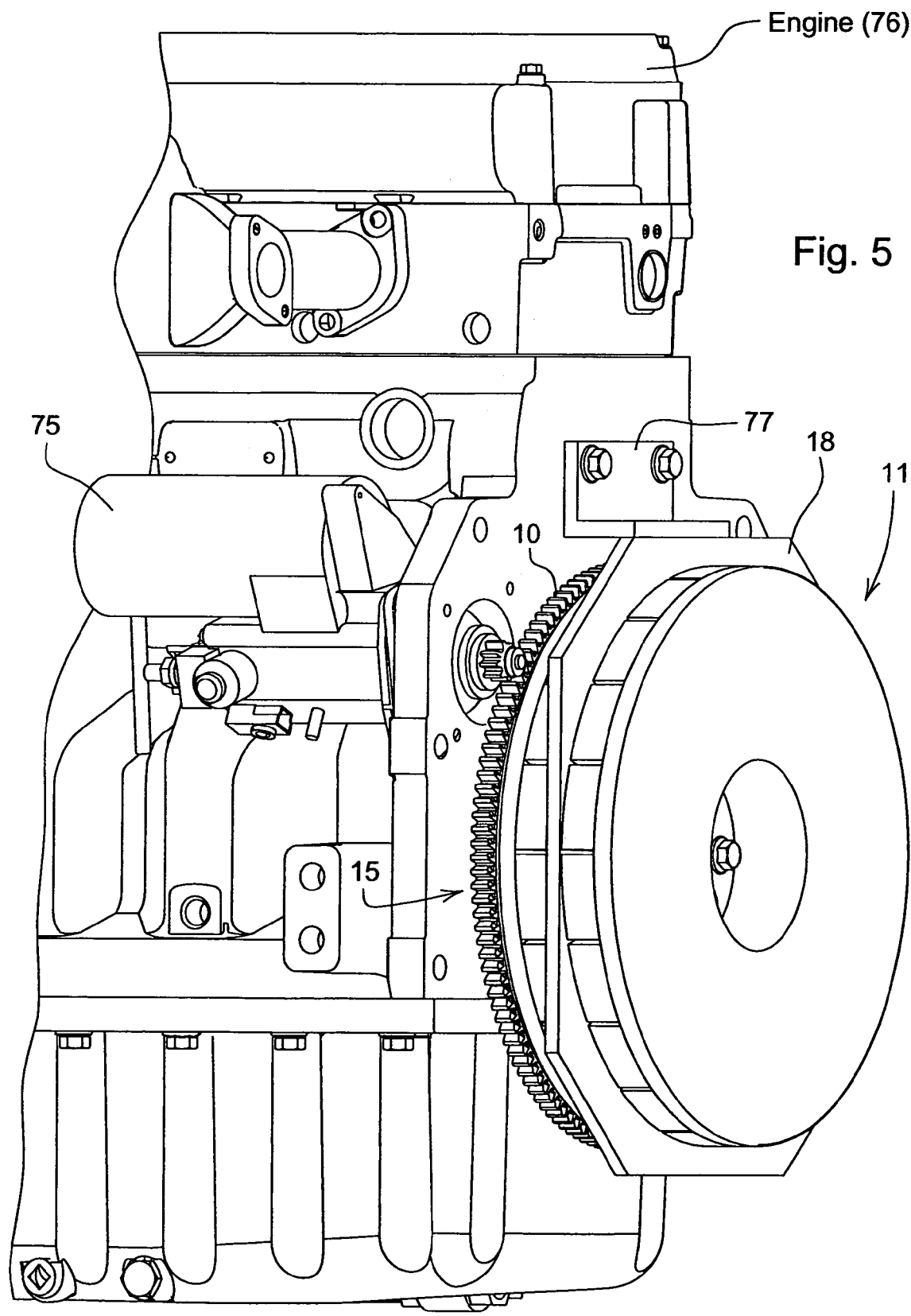
FIG. 5 is a perspective view of a first embodiment of the axial gap alternator installed on an engine.
Figure 6:
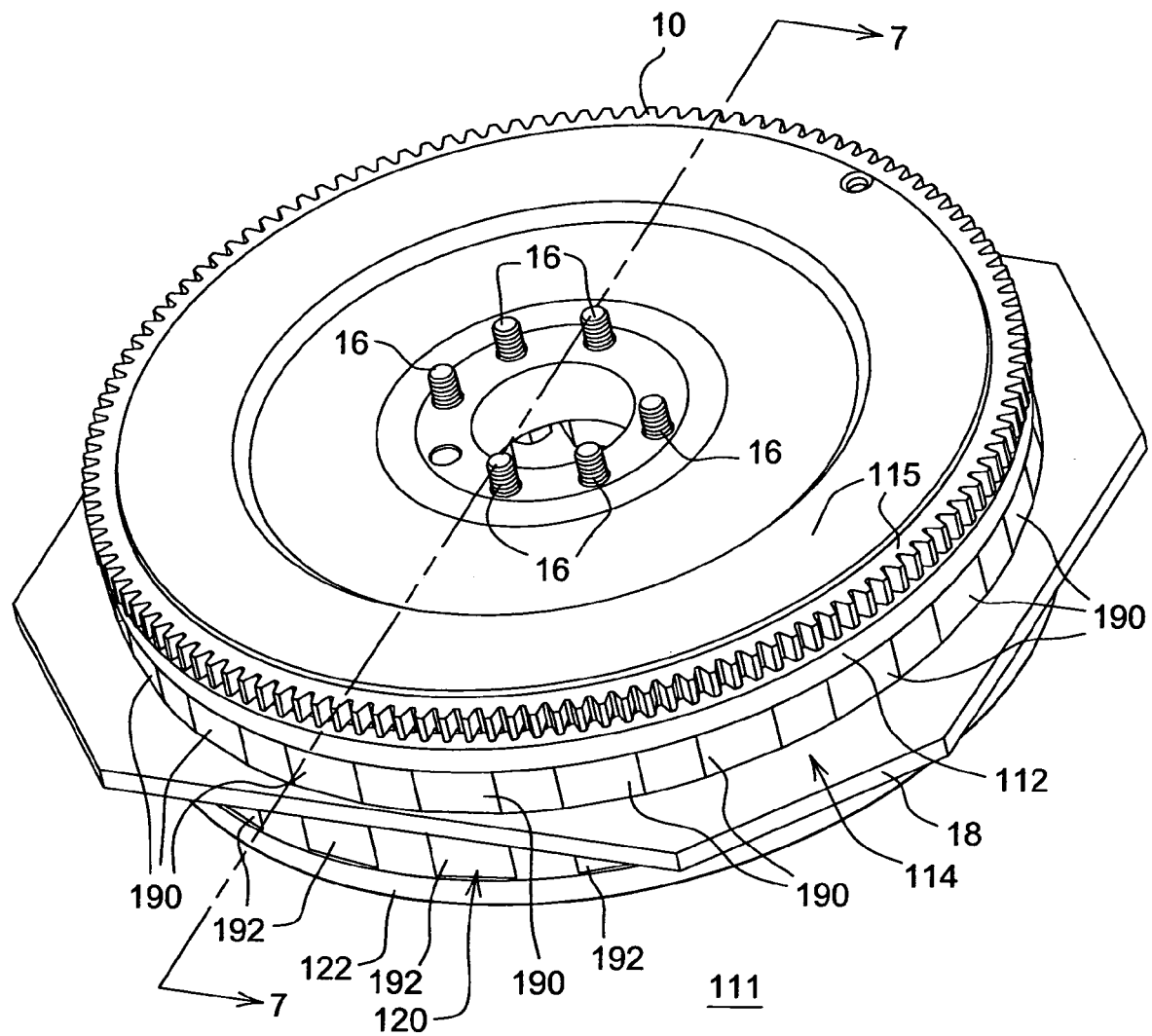
FIG. 6 is an assembled perspective view of the second embodiment of the axial gap alternator.

In general, a flywheel is a wheel or other device that by its inertia reduces fluctuation in the rotational speed of the output shaft (e.g., crankshaft) or counteracts variations in torque of the output shaft of the internal combustion engine. The flywheel 15 may be generally shaped like a disc with gear teeth about its circumference or outer diameter. The gear teeth or ring gear 10 may be arranged to engage with a corresponding gear of a starter motor 75 (FIG. 5) of an internal combustion engine 76 (FIG. 5). In one embodiment, the flywheel 15 comprises the ring gear 10 and the first carrier 12, collectively. For example, the ring gear 10 may be press-fitted or otherwise secured onto a shelf or step of the first carrier 12; the ring gear 10 and the first carrier 12 may be locked together for simultaneous rotation by the press-fit, a key, a detent, a pawl, an interlocking member, a combination of a mating radial protrusion and recess, or another mechanism. In another embodiment, the flywheel may be cast, forged, extruded, machined, or otherwise formed such that the gear teeth are integral with the first carrier 12. If the flywheel is integral with the gear teeth, the first carrier 12 and the gear teeth are part of a single unitary structure (e.g., casting, forging, or formation) of substantially the same general material composition, except for possible hardening or tempering of the gear teeth differently from a remainder of the flywheel.

The combination of the first carrier 12 and the first set 14 of magnets may be referred to as the first rotor 94. The combination of the second carrier 22 and the second set 20 of magnets may be referred to as the second rotor 96. Each magnet within the first set 14 may be referred to as a first magnet 90, whereas each magnet within the second set 20 may be referred to as a second magnet 92. The first rotor 94 and the second rotor 96 are arranged to rotate simultaneously and synchronously with respect to one another by mechanically coupling of a hub or cylindrical portion 24 of the second carrier 22 to bores in the first carrier 12 via one or more fasteners 16. The first rotor 94 and the second rotor 96 are spaced axially apart from each other on each side of the stator 16 such that a first axial force produced by a first magnetic field associated with the first set 14 of magnets generally cancels out an opposing second axial force produced by a second magnetic field associated with the second set 20 of magnets. The first axial force results from the interaction of the first set 14 with a magnetic field of the stator 18 and the second axial force results from the interaction of the second set 20 with the magnetic field of the stator 18. Accordingly, the thrust load or axial load on the crankshaft or output shaft of the engine is reduced, which reduces or eliminates the need for auxiliary thrust bearings. Further, the main bearings of the crankshaft may experience greater longevity where thrust loads or axial loads are minimized.

The first carrier 12 is generally annular or disc-shaped with a central opening. The first carrier 12 has a generally annular surface about the central opening or another mating surface for receiving a corresponding cylindrical portion 24 (or a hub) of the second carrier 22. One or more bores are located in the first carrier 12 near the central opening and in the second carrier 22; the bores are adapted to receive the fasteners 16.

In one embodiment, the first carrier 12 and the ring gear 10 collectively comprise the flywheel 15. The first carrier 12 is preferably composed of metal or an alloy to attain a suitable weight or mass for a flywheel of the internal combustion engine. The first carrier 12 has a mass or weight to supplement that of the ring gear 10. The ring gear 10, the first carrier 12, and the second carrier 22 may collectively balance or counter-balance torque variations applied to the crankshaft (e.g., by different combustion chambers) of the internal combustion engine. Accordingly, the combination of the ring gear 10, the first carrier (e.g., 12 or 112), and the second carrier (e.g., 22 or 122) may be referred to as or function as an aggregate flywheel. Similarly, the combination of the first rotor (e.g., 94) and the second rotor (e.g., 96) may be referred to as the aggregate flywheel. The second carrier 22 may be composed of a metal or an alloy to achieve a desired total mass for the aggregate flywheel (e.g., the first carrier 12, the ring gear 10, and the second carrier 22, collectively).

The metal or alloy is ferrous or can be magnetized such that the first carrier 12 may enhance or focus the first magnetic field produced by the first set 14 of magnets or facilitate hysteresis of the magnetic field associated with the first set 14 of magnets. Hystereis refers to the lagging of an increase in an induced magnetic field behind an increase in magnetic intensity, the lagging of decrease in an induced magnetic field behind a reduction of intensity, or both. Although the first carrier 12 may be composed of any magnetizable alloy or metal, in one illustrative example, the first carrier 12 may be constructed of cast iron, ductile iron, or a ferromagnetic material.

In an alternate embodiment, the first carrier 12 and the ring gear 10 (collectively referred to as the flywheel 15) may be integrated together into a single unitary structure, formation, casting or forging.

Figure 4:
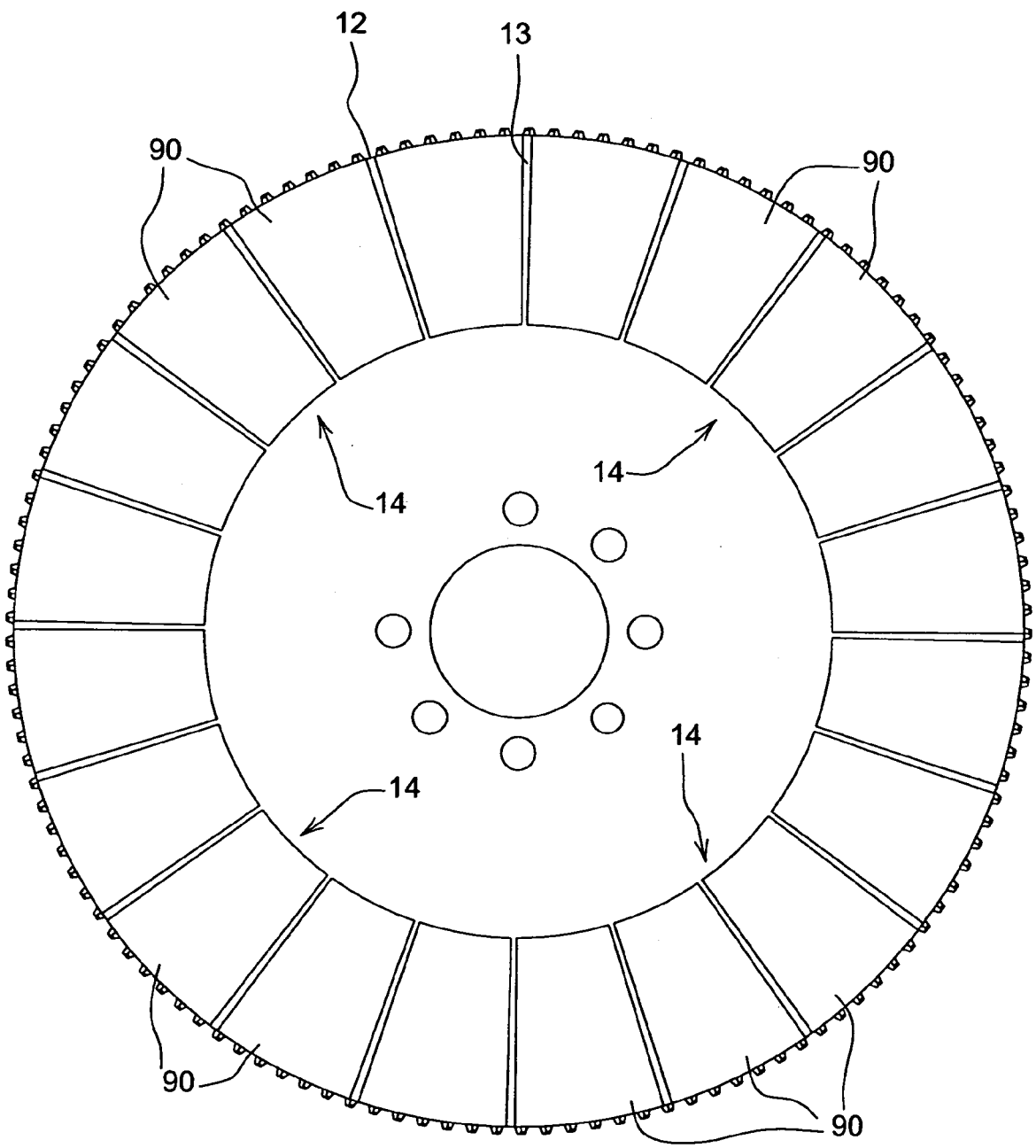
FIG. 4 is a view of a first carrier of the axial gap alternator, with a first set of magnets mounted on the first carrier.

In one embodiment, the first set 14 of magnets are positioned or secured radially on a face 13 of the first carrier 12 about a rotational axis of the first carrier 12. For example, the first set 14 of magnets is bonded or adhesively bonded to the face 13 of the first carrier 12. The first set 14 of magnets and the second set 20 of magnets may be generally pie-shaped or divisions of an annular shape to maximize the surface area of the magnets and the generation of electrical energy by interaction with the stator 18. FIG. 4 provides an illustration of the first set 14 of magnets on the first carrier 12 and will be described later in greater detail.

In one embodiment, the second carrier 22 has a generally annular portion 26 and a central cylindrical portion 24. For example, the second carrier 22 may be shaped somewhat like a top hat. The central cylindrical portion 24 may have a central opening in one end and may be referred to as a hub. The cylindrical portion 24 or hub has one or more bores for receiving the fasteners 16. The second carrier 22 is secured to the first carrier 12 (or the flywheel 15) for rotation therewith. For example, the second carrier 22 and the first carrier 12 are secured together via one or more fasteners 16 arranged about a rotational axis. Although the second carrier 22 may be composed of any magnetizable alloy or metal; in one illustrative example, the second carrier 22 may be constructed of cast iron, ductile iron, or a ferromagnetic material to enhance or focus the second magnetic field produced by the second set 20 of magnets or facilitate hysteresis of the magnetic field associated with the second set 20 of magnets. In one embodiment, the second set 20 of magnets are positioned or secured radially on a face (or generally annular portion 26) of the second carrier 22 about a rotational axis of the second carrier 22. For example, the second set 20 of magnets is bonded or adhesively bonded to the generally annular portion 26 of the second carrier 22. In practice, in certain embodiments, the second carrier 22 may have mounting provisions (e.g., additional threaded or unthreaded bores) for receiving a clutch assembly for a manual transmission or a torque converter for an automatic transmission.

The stator 18 may comprise a stator with a core (e.g., iron core or ferromagnetic core), a laminated core, or a coreless stator. If the stator 18 has a core, the core may comprise an iron core or a laminated core with a pole count that is commensurate with a pole count of the first rotor 94 or the second rotor 96, individually. In one embodiment, the first rotor 94 and the second rotor 96 have substantially the same rotor pole count, where each rotor pole represents the pole of a magnet (e.g., 90 or 92). (Although a rotor pole sometimes may be defined as a pair of two magnets (90,92) facing each other across the stator 18, we do not adopt that convention here to count the number of rotor poles.) In another embodiment, a ratio of the combined rotor pole count (of the first rotor 94 and second rotors 96) to the stator pole count of the stator 18 is approximately 3 to 2, although other ratios of the combined rotor pole count to the stator count may be used to practice the alternator (e.g., 11). For example, each rotor (94, 96) has a pole count of approximately 18, and the stator 18 has a pole count of approximately 24, although other numbers and ratios of poles may fall within the scope of the claims.

If the stator 18 is a coreless stator, the stator 18 may be encapsulated in a polymer or plastic. The stator 18 has one or more windings (not shown) in which electrical current is induced from rotation of the first set 14 of magnets, the second set 20 of magnets, or both. The windings may feed a rectifier for converting a generated alternating current signal into a direct current (DC) signal, or be connected to a load or other circuitry (e.g., voltage regulator).

In one configuration, the stator 18 may include a conduit or passage for carrying a fluid coolant (e.g., liquid, antifreeze, or water) to cool the stator 18 and the axial alternator 11. The passage may form one or more loops within the stator 18 for cooling the stator 18 with a fluid coolant to facilitate greater power generation capacity (e.g., greater amperage output at a given voltage or greater duty cycle) of the axial alternator 11. As shown in FIG. 1, the stator 18 is generally shaped like a segment of a ring, although other shapes and configurations are possible and fall within the scope of the invention. The passage in the stator 18 may be connected to one or more of the following devices: tubing for carrying the fluid coolant, a pump for pumping the fluid coolant, an optional reservoir for storing the fluid coolant, and a heat exchanger or radiator to circulate the fluid coolant for cooling of the stator 18.

Figure 2:
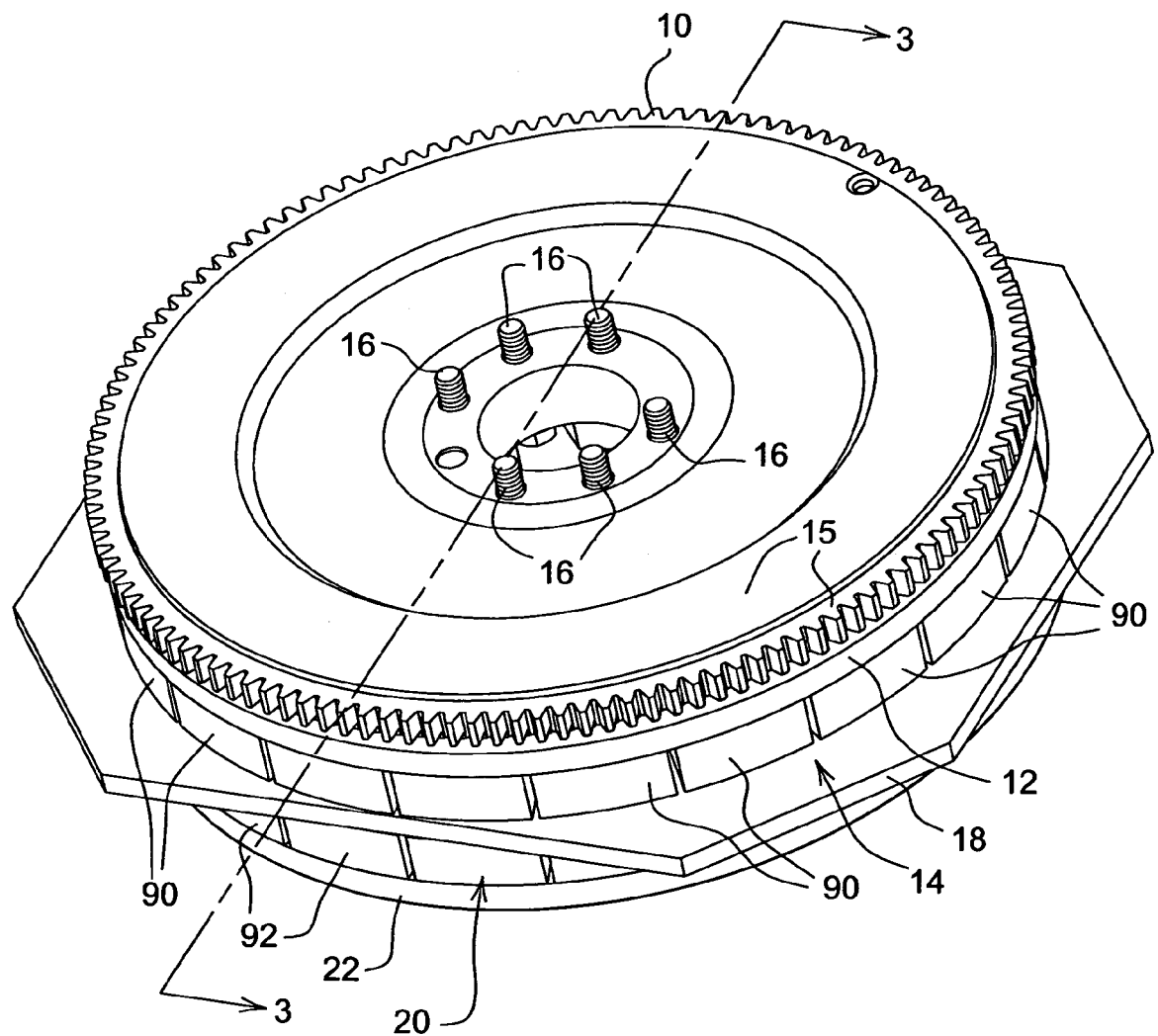
FIG. 2 is an assembled perspective view of the first embodiment of the axial gap alternator.

FIG. 2 shows an assembled perspective view of the axial gap alternator 11 of FIG. 1, which provides an exploded view of the axial gap alternator 11. Like reference numbers in FIG. 1 and FIG. 2 indicate like elements.

Figure 3:
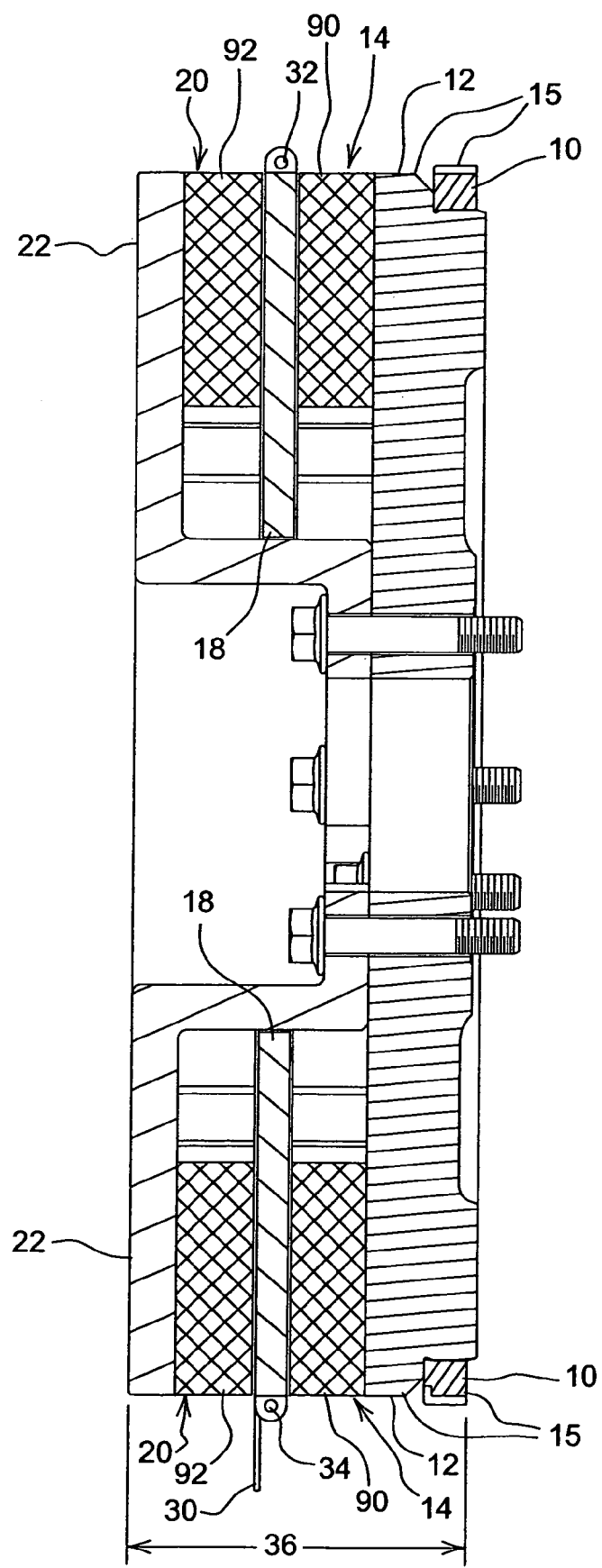
FIG. 3 is a cross sectional view of the first embodiment of the axial gap alternator as viewed along reference line 3-3 of FIG. 2.

FIG. 3 shows a cross sectional view of the axial gap alternator 11 as viewed along reference line 3-3 of FIG. 2. Like reference numbers in FIG. 1 and FIG. 3 indicate like elements.

As shown in FIG. 3, the assembled axial gap alternator 11 has a total axial thickness 36 and overall size that facilitates (a) integration of the axial gap alternator 11 between an output shaft or crankshaft of an internal combustion engine and a transmission or other gearbox or (b) coupling of the axial gap alternator 11 with an engine or engine output shaft to provide an electrical energy output (e.g., to one or more electric drive motors for propelling a vehicle or for any other vehicular or non-vehicular loads). For example, for a rear-wheel drive vehicle or all-wheel drive vehicle, the axial gap alternator 11 may be positioned in a fly-wheel housing of an engine or a bell-housing of a transmission between the transmission input shaft and the engine output shaft. The axially compact design of the axial gap alternator 11 supports high capacity electrical energy generation (e.g., 40 KW or greater) without lengthening a vehicular chassis of the vehicle or materially enlarging a standard flywheel housing or bell-housing. Further, the axially compact design may facilitate improved or efficient utilization of engine compartment space in various vehicles.

In FIG. 3, the alignment of the first set 14 of magnets and the second set 20 of magnets is readily apparent. Further, the exit and entry ports (32, 34) of the passage or conduit for cooling the stator 18 are displayed in the view of FIG. 3. The ports (32, 34) may be associated with threads or couplings for connection to tubing for carrying the coolant fluid. The tubing is connected to one or more of the following devices: a pump for circulating the coolant fluid, a heat exchanger for dissipating heat from the coolant fluid to the ambient environment, and an optional coolant fluid reservoir for storing the coolant fluid. The coolant may prevent thermal damage to the stator 18, the first carrier 12, the second carrier 22, and the magnets (90, 92), and increase the steady state or transient power generation capacity of the axial gap alternator 11. For example, the circulation of the coolant may prevent warping of the first carrier 12 and the second carrier 22, and may facilitate the longevity and maintenance (or inhibiting degradation) of the magnetic properties of the first set 14 of magnets and second set 20 of magnets.

One or more conductors 30 are associated with the windings of the stator 18 and exit the stator 18. If the alternator 11 operates in a power generation mode, the electrical energy is induced in the stator 18 and is available at the conductors 30. In a power generation mode, the conductors 30 may be coupled to a rectifier or another device for rectifying the induced current from alternating current to direct current, for example. If the alternator 11 operates as a motor in a propulsion mode or motor mode, electrical energy is applied to the conductors 30 and magnetic fields are induced about the windings of the stator 18; the induced magnetic fields interact with the first set 14 of magnets and the second set of magnets 20 to cause them and/or a shaft of the alternator to rotate.

FIG. 4 shows a face 13 of the first carrier 12. The first carrier 12 comprises a first set of magnets 14 arranged radially and secured to the face 13 of the first carrier 12. Each of the first magnets 90 may be generally wedge-shaped, pie-shaped, generally polygonal shaped, or otherwise shaped. As shown in FIG. 4, the first magnets 90 are shaped to maximize a surface area of the magnets within a generally annular region.

The magnets or divisions, which are generally pie-shaped, of an annular shape may provide a greater surface area than rectangular magnets and, hence, greater magnetic field strength for inducing a stronger electrical current in the stator 18 for a given rotational speed of the first carrier 12 or the second carrier 22. The first set 14 of magnets may comprise rare-earth magnets, for example. The first carrier 12 and the second carrier 22 are secured together for rotation together and simultaneous movement of the first set 14 of magnets and the second set 20 of magnets with respect to the stator 18.

A first axial force is produced by an interaction of the first set 14 of magnets with an induced magnetic field associated the stator windings of the stator 18 and the second axial force is produced by an interaction of the second set 20 of magnets with the induced magnetic field associated with the stator windings of the stator 18. The induced magnetic field (e.g., magnitude or orientation of magnetic flux lines of the magnetic field) associated with the stator 18 may be manipulated or influenced by the configuration of the stator poles associated with the stator 18, for example. The first axial force opposes and substantially cancels out the second axial force to reduce the net axial force or thrust load on an output shaft or other shaft coupled to the axial gap generator 11.

FIG. 5 shows a perspective view of the axial gap alternator 11 installed on an engine 76. The axial gap alternator 11 cooperates with a starter motor 75, as shown for example. The stator 18 may be supported by a member 77, bracket, or beam for interconnection to the engine block or internal combustion engine 76.

The axial gap alternator 111 illustrated in FIG. 6 through FIG. 9 is similar to the axial gap alternator 11 illustrated in FIG. 1 through FIG. 5, except the first set 114 of magnets are embedded into recesses in the first carrier 112 or its face 113 to reduce the axial profile or dimensions of the overall axial gap alternator 111; the second set of magnets 120 are embedded into recesses in the second carrier 122 or its face or its annular portion to reduce the axial thickness 36, axial profile or axial dimensions of the overall axial gap alternator 111. As illustrated, the flywheel 115 comprises the combination of the first carrier 112 and the ring gear 10, although the first carrier 112 and gear teeth may be integrated into a unitary flywheel structure in an alternate configuration. Further, the first magnets 190 and second magnets 192 of FIG. 6 through FIG. 9 may be generally rectangular or have another geometric shape, whereas the first magnets 90 and second magnets 92 of FIG. 1 through FIG. 5 may be generally pie-shaped or divisions of an annular shape. In an alternate embodiment, the first magnet 190 and the second magnet 192 may be generally pie-shaped or divisions of an annular shape. Like reference numbers in FIG. 1 through FIG. 9 indicate like elements.

Figure 7:
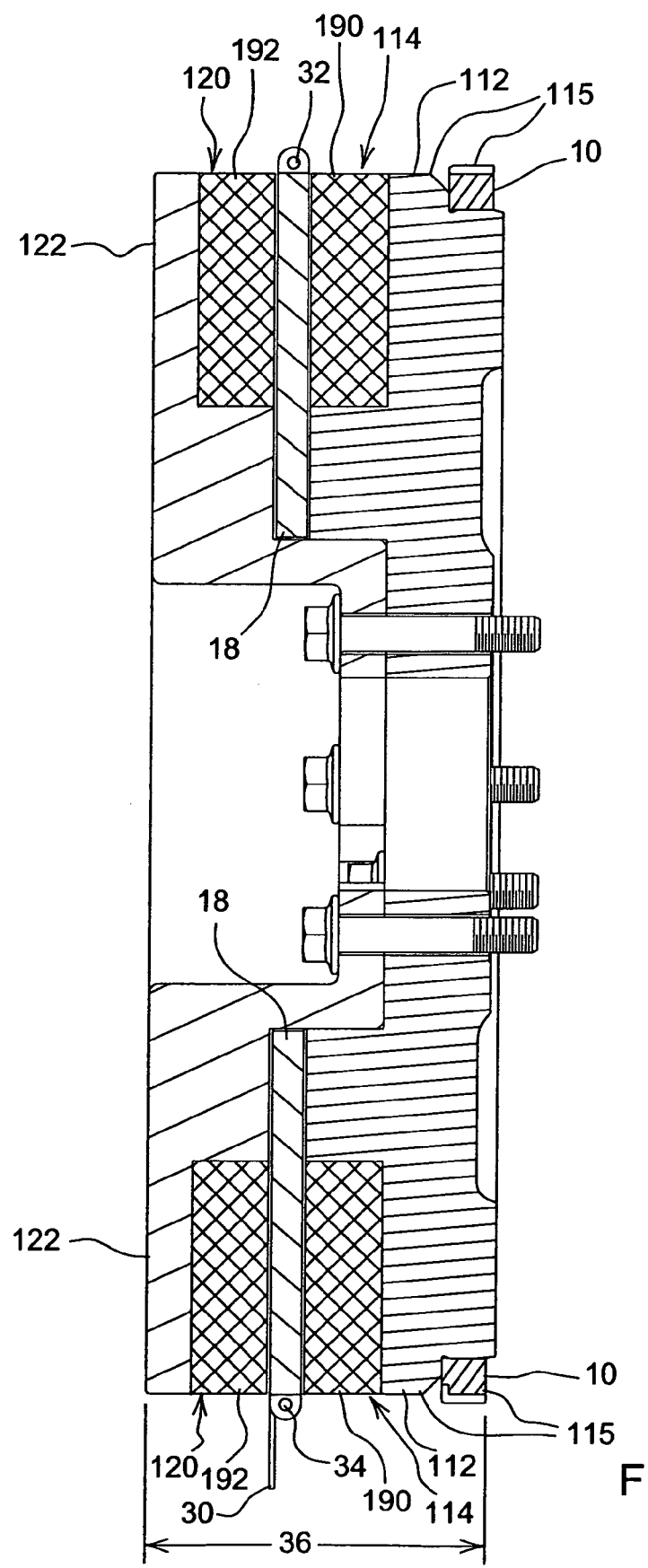
FIG. 7 is a cross sectional view of the second embodiment of the axial gap alternator as viewed along reference line 7-7 of FIG. 6.
Figure 8:
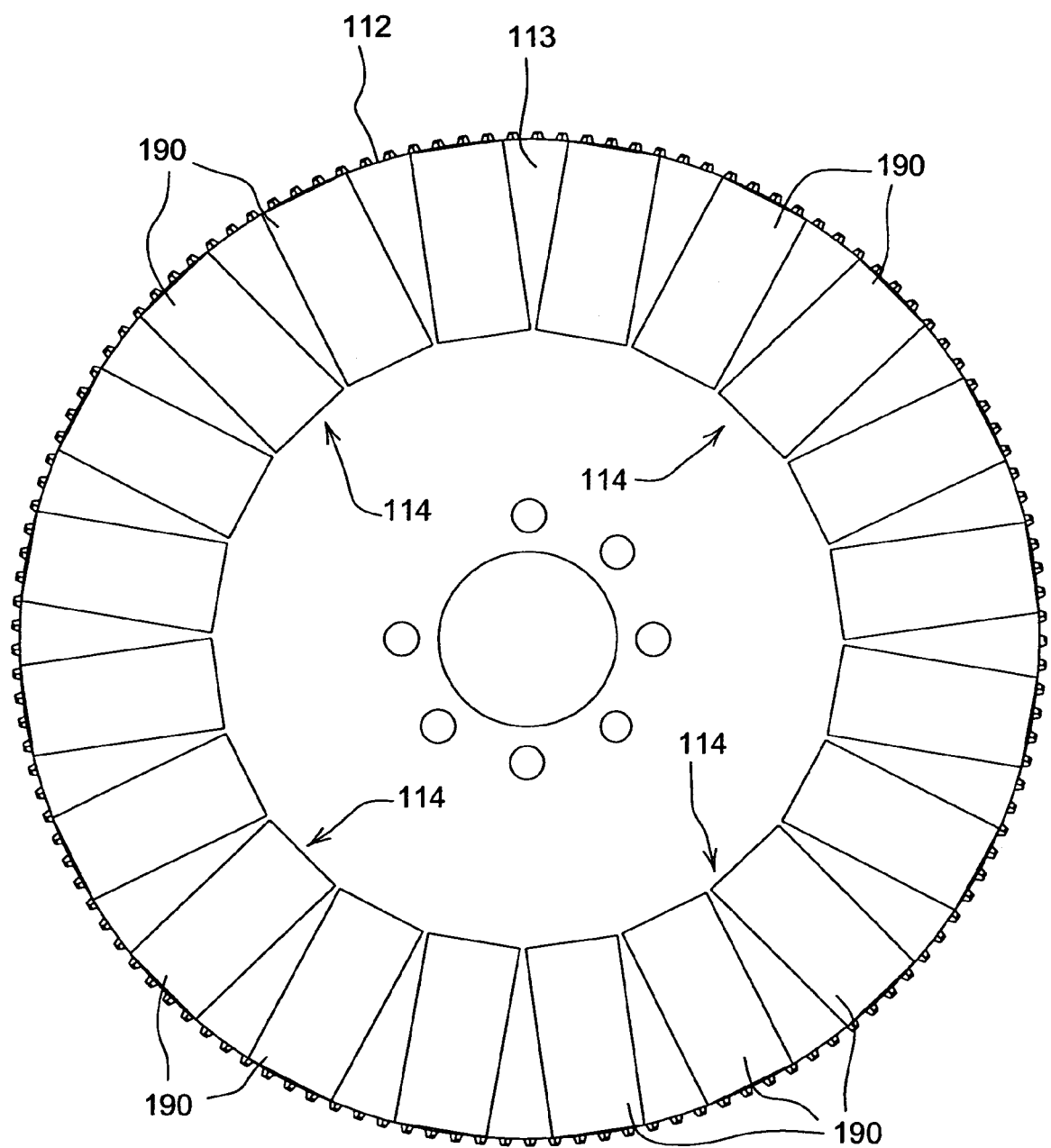
FIG. 8 is a view of a first carrier of the axial gap alternator of FIG. 6, with a first set of magnets mounted on the first carrier.

As best illustrated in FIG. 7, the axial gap alternator 111 of FIG. 6 through FIG. 9 with the embedded magnets supports a first axial gap between the stator 18 and the first set 114 of magnets and a second axial gap between the stator 18 and the second set 120 of magnets. The first magnets 190 may be secured within recesses in the first carrier 112 by an adhesive, a press fit or both, such that a generally planar surface of each first magnet is substantially flush or co-planar with a face 113 of the first carrier 112. Similarly, the second magnets 192 may be secured within recesses in the second carrier 122 by an adhesive a press fit, or both such that a generally planar surface of each second magnet is substantially flush or co-planar with a face or surface (or exterior surface of the annular portion) of the second carrier 122. The press-fit or walls of the recesses in the first carrier 112 may prevent lateral movement or other movement of the first magnets with respect to the first carrier 112 that might otherwise contribute to the need for a greater axial clearance for the first axial gap. Likewise, the press-fit or walls of the recesses in the second carrier 122 may prevent lateral movement or other movement of the second magnets with respect to the second carrier 122 that might otherwise contribute to the need for a greater axial clearance for the second axial gap. Accordingly, to the extent the first axial gap, the second axial gap, or both are reduced or minimized, the axial gap alternator 111 facilitates the use of smaller or less powerful magnets, or potentially greater torque and potentially higher rotational operating speeds.

Advantageously, the axial gap alternator 111 generally minimizes or eliminates the thrust load on the crankshaft of an internal combustion engine associated with the axial gap alternator 111 because the axial forces imparted by the first set 114 of magnets substantially cancels out the axial forces imparted by the second set 120 of magnets. Accordingly, there is no need for additional thrust bearings or other supplemental measures to balance thrust, except for possibly any thrust bearings that are integral to the internal combustion engine.

In an alternate embodiment applicable to FIG. 6 through FIG. 9, the first magnets 190 and the second magnets 192 may have a central region or a center with a greater thickness than one or more peripheral regions surrounding the center or central region; accordingly, the recesses in the first carrier 112 and second carrier 122 correspond in profile to the variation in thickness of the first magnets 190 and second magnets 192 such that the generally planar surfaces of the first magnets 190 and the second magnets 192 are generally co-planar with an exterior face of the first carrier 112 and the second carrier 122, respectively. The greater thickness or variable thickness of the first magnets 190 and the second magnets 192 may facilitate stronger magnetic fields than otherwise possible with magnets of uniform thickness, for instance.

Although the axial gap alternator (11 or 111) is primarily described as a generator, alternator or power generation device for operation in a power generation mode, the axial gap alternator (11 or 111) may be operated as a motor in a propulsion mode to impart rotational movement to a shaft associated with the first carrier (12 or 112), the second carrier (22 or 122), or both. In the propulsion mode, electrical energy is applied to one or more windings of the stator 18. A controller, motor controller, inverter, or chopper or signal generator may provide a suitable direct current signal, alternating current signal, pulse width modulation signal, a multi-phase signal, or other signal to achieve operation of the alternator (11 or 111) in the propulsion mode.

Having described one or more preferred embodiments, it will become apparent that various modifications can be made without departing from the scope of the invention as defined in the accompanying claims.

The following is claimed:

1. An axial gap alternator comprising:
   a first carrier associated with an output shaft of an internal combustion engine, the first carrier carrying a first set of magnets arranged radially, the first set of magnets secured within recesses in the first carrier, such that a generally planar surface of each first magnet of the first set is substantially flush or co-planar with a radially inward face of the first carrier, the face being radially inward from the first set;
   a second carrier for carrying a second set of magnets arranged radially and spaced apart from the first set of magnets, the second carrier secured to the first carrier for rotation therewith the second set of magnets secured within recesses in the second carrier, such that a generally planar surface of each second magnet of the second set is substantially flush or co-planar with a radially inward face of the second carrier, the face being radially inward from the second set;
   a stator intervening axially between the first set of magnets and the second set of magnets; and
   the first carrier, second carrier and stator positioned in a fly-wheel housing or transmission housing between a transmission and the output shaft;
   wherein the recesses within which the first and second set of magnets are secured facilitates a reduction in an axial dimension of the axial gap alternator thereby facilitating efficient utilization of space between the output shaft of the internal combustion engine and the transmission.

2. The axial gap alternator according to claim 1 further comprising:
   a first rotor comprising the first set of magnets and the first carrier;
   a second rotor comprising the second set of magnets and the second carrier, the second rotor spaced axially apart from the first rotor, on opposite sides of the stator, such that a first axial force produced by a first magnetic field associated with the first set interacting with the stator generally cancels out an opposing second axial force produced by a second magnetic field associated with the second set interacting with the stator through manipulation of a configuration of stator poles to minimize or eliminate a thrust load on the output shaft of the internal combustion engine.

3. The alternator according to claim 2 wherein a ratio of a combined rotor pole count, of the first rotor and the second rotor, to a stator pole count of the stator is approximately 3 to 2.

4. The alternator according to claim 2 wherein each rotor has a pole count of approximately 18, and the stator has a pole count of approximately 24.

5. The axial gap alternator according to claim 1 wherein the first set of magnets are secured within the recesses in the first carrier by at least one of an adhesive and a press fit; and wherein the second set of magnets are secured within the recesses in the second carrier by at least one of an adhesive and a press fit.

6. The axial gap alternator according to claim 5 wherein each first magnet of the first set of magnets is generally rectangular and wherein each second magnet of the second set of magnets is generally rectangular.

7. The axial gap alternator according to claim 1 wherein each first magnet and each second magnet is generally pie-shaped or representative of a division of an annular region.

8. The alternator according to claim 1 wherein the second carrier has a generally annular portion and a central cylindrical portion.

9. The alternator according to claim 1 further comprising a ring gear secured to the first carrier, where the ring gear and the first carrier comprise a flywheel.

10. The alternator according to claim 1 wherein the second carrier and the first carrier are secured to the output shaft via one or more fasteners arranged about a rotational axis.

11. The alternator according to claim 1 wherein the stator further comprises a passage for cooling the stator with a liquid coolant.

12. The alternator according to claim 1 wherein the stator comprises a coreless stator.

13. The alternator according to claim 1 wherein the stator comprises a core and one or more stator windings; and the first axial force being produced by an interaction of the first set of magnets with an induced magnetic field associated with the stator windings and the second axial force being produced by an interaction of the second set of magnets with the induced magnetic field associated with the stator windings.

14. The alternator according to claim 1 wherein the first carrier is composed of cast iron or ductile iron to focus a first magnetic field of the first set of magnets or induce hysteresis in the first magnetic field.

15. The alternator according to claim 1 further comprising a ring gear, secured to the first carrier; where the ring gear, the first carrier, and the second carrier comprise an aggregate flywheel having a desired total mass for the aggregate flywheel.

16. The alternator according to claim 2 wherein a pole count of the first rotor or the second rotor, individually, is commensurate with a stator pole count.

17. An alternator comprising:
   a first carrier associated with an output shaft of an internal combustion engine, the first carrier carrying a first set of magnets arranged radially, the first set of magnets secured within recesses in the first carrier, such that a generally planar surface of each first magnet of the first set is substantially flush or co-planar with a radially inward face of the first carrier, the face being radially inward from the first set;
   a second carrier for carrying a second set of magnets arranged radially and spaced apart from the first set of magnets, the second carrier secured to the first carrier for rotation therewith the second set of magnets secured within recesses in the second carrier, such that a generally planar surface of each second magnet of the second set is substantially flush or co-planar with a radially inward face of the second carrier, the face being radially inward from the second set;
   a stator intervening axially between the first set of magnets and the second set of magnets;
   a first rotor comprising the first set of magnets and the first carrier;
   a second rotor comprising the second set of magnets and the second carrier, the second rotor spaced axially apart from the first rotor, on opposite sides of the stator, such that a first axial force produced by a first magnetic field associated with the first set interacting with the stator generally cancels out an opposing second axial force produced by a second magnetic field associated with the second set interacting with the stator through manipulation of a configuration of stator poles to minimize or eliminate a thrust load on the output shaft of the internal combustion engine.

18. The alternator according to claim 17 wherein a ratio of a combined rotor pole count, of the first rotor and the second rotor, to a stator pole count of the stator is approximately 3 to 2.

19. The alternator according to claim 17 wherein each rotor has a pole count of approximately 18, and the stator has a pole count of approximately 24.

* * * * *

UNITED STATES PATENT AND TRADEMARK OFFICE
CERTIFICATE OF CORRECTION

| | | |
|---|---|---|
| PATENT NO. | : 7,372,182 B2 | |
| APPLICATION NO. | : 11/441416 | |
| DATED | : May 13, 2008 | |
| INVENTOR(S) | : Bernard Brandt Poore et al. | |

It is certified that error appears in the above-identified patent and that said Letters Patent is hereby corrected as shown below:

On the title page item (75),

Spelling of Mr. Romig's name should be:

Bernard Edwin Roming not

Barnard Edwin Roming

Signed and Sealed this

Second Day of December, 2008

JON W. DUDAS
*Director of the United States Patent and Trademark Office*